United States Patent
Kaltenbach et al.

(10) Patent No.: US 8,272,993 B2
(45) Date of Patent: Sep. 25, 2012

(54) METHOD FOR CARRYING OUT A LOAD SHIFT IN VEHICLES WITH ELECTRIC DRIVE

(75) Inventors: Johannes Kaltenbach, Friedrichshafen (DE); Stefan Wallner, Friedrichshafen (DE)

(73) Assignee: ZF Friedrichshafen AG, Friedrichschafen (DE)

( * ) Notice: Subject to any disclaimer, the term of this patent is extended or adjusted under 35 U.S.C. 154(b) by 382 days.

(21) Appl. No.: 12/671,130

(22) PCT Filed: Aug. 8, 2008

(86) PCT No.: PCT/EP2008/060443
§ 371 (c)(1),
(2), (4) Date: Jan. 28, 2010

(87) PCT Pub. No.: WO2009/021916
PCT Pub. Date: Feb. 19, 2009

(65) Prior Publication Data
US 2010/0197452 A1 Aug. 5, 2010

(30) Foreign Application Priority Data
Aug. 16, 2007 (DE) .......................... 10 2007 038 775

(51) Int. Cl.
B60W 10/02 (2006.01)
B60W 10/08 (2006.01)
B60W 10/10 (2012.01)
(52) U.S. Cl. .............................................. 477/8; 477/20
(58) Field of Classification Search ................ 477/8, 20, 477/109, 111
See application file for complete search history.

(56) References Cited

U.S. PATENT DOCUMENTS

| | | | |
|---|---|---|---|
| 4,021,712 A | 5/1977 | Ishihara et al. | |
| 5,890,392 A | 4/1999 | Ludanek et al. | |
| 6,059,059 A | 5/2000 | Schmidt-Brucken | |
| 6,077,186 A | 6/2000 | Kojima et al. | |
| 6,166,512 A | 12/2000 | Kojima | |
| 6,176,807 B1 | 1/2001 | Oba et al. | |
| 6,319,168 B1 | 11/2001 | Morris et al. | |
| 6,504,259 B1 | 1/2003 | Kuroda et al. | |
| 6,505,109 B1 | 1/2003 | Strandell et al. | |
| 6,506,139 B2 | 1/2003 | Hirt et al. | |
| 6,524,219 B2 | 2/2003 | Mesiti et al. | |
| 6,543,561 B1 | 4/2003 | Pels et al. | |
| 6,574,535 B1 | 6/2003 | Morris et al. | |
| 6,871,734 B2 | 3/2005 | Kupper et al. | |
| 6,887,184 B2 | 5/2005 | Buchannan et al. | |
| 6,938,713 B1 | 9/2005 | Tahara et al. | |
| 7,395,837 B2 | 7/2008 | Foster et al. | |
| 7,464,616 B2 | 12/2008 | Leibbrandt et al. | |
| 7,500,932 B2 | 3/2009 | Katakura et al. | |
| 7,670,257 B2 * | 3/2010 | Popp et al. ........................ | 477/6 |
| 2003/0010548 A1 | 1/2003 | Mesiti et al. | |

(Continued)

FOREIGN PATENT DOCUMENTS

DE 44 38 914 A1 5/1996

(Continued)

Primary Examiner — Edwin A Young
(74) Attorney, Agent, or Firm — Davis & Bujold, P.L.L.C.

(57) ABSTRACT

A method of carrying out a shift under load in either an electric vehicle which has a change-under-load transmission or a hybrid vehicle which has a hybrid transmission while the vehicle is operating in a purely electrical mode. The speed adaptation of the electric machine, which is required for synchronization to a new gear, is carried out in a speed regulation mode.

18 Claims, 2 Drawing Sheets

U.S. PATENT DOCUMENTS

| | | | |
|---|---|---|---|
| 2005/0088123 | A1 | 4/2005 | Wakitani et al. |
| 2005/0164827 | A1 | 7/2005 | Beaty et al. |
| 2005/0209047 | A1 | 9/2005 | Berger et al. |
| 2005/0221947 | A1 | 10/2005 | Mesiti et al. |
| 2006/0113858 | A1 | 6/2006 | Hino et al. |
| 2006/0199696 | A1 | 9/2006 | Gouda et al. |
| 2007/0056783 | A1 | 3/2007 | Joe et al. |
| 2007/0095584 | A1 | 5/2007 | Roske et al. |
| 2007/0102211 | A1 | 5/2007 | Nozaki et al. |
| 2007/0114081 | A1 | 5/2007 | Iwanaka et al. |
| 2008/0036322 | A1 | 2/2008 | Franke |
| 2008/0245332 | A1 | 10/2008 | Rimaux et al. |
| 2009/0051309 | A1 | 2/2009 | Rehm et al. |
| 2009/0146615 | A1 | 6/2009 | Zillmer et al. |
| 2009/0223727 | A1 | 9/2009 | Tolksdorf |

FOREIGN PATENT DOCUMENTS

| | | |
|---|---|---|
| DE | 196 31 983 C1 | 2/1998 |
| DE | 197 09 457 A1 | 9/1998 |
| DE | 198 14 402 A1 | 10/1999 |
| DE | 199 45 473 A1 | 4/2000 |
| DE | 199 39 334 A1 | 3/2001 |
| DE | 101 26 348 A1 | 1/2002 |
| DE | 103 40 529 A1 | 3/2004 |
| DE | 103 27 306 A1 | 1/2005 |
| DE | 10 2004 022 767 A1 | 7/2005 |
| DE | 600 22 593 T2 | 2/2006 |
| DE | 698 31 468 T2 | 6/2006 |
| DE | 10 2005 015 657 A1 | 10/2006 |
| DE | 10 2006 019 679 A1 | 11/2006 |
| DE | 10 2005 057 607 B3 | 4/2007 |
| DE | 10 2005 051 382 A1 | 5/2007 |
| DE | 11 2006 001 985 T5 | 5/2008 |
| EP | 1 167 834 A1 | 1/2002 |
| EP | 1 177 930 A2 | 2/2002 |
| EP | 1 219 493 A1 | 7/2002 |
| EP | 13 19 546 A1 | 6/2003 |
| EP | 1 450 074 A2 | 8/2004 |
| EP | 1 468 865 A2 | 10/2004 |
| EP | 1 527 927 A1 | 5/2005 |
| EP | 1 255 656 B1 | 3/2006 |
| EP | 1 714 817 A1 | 10/2006 |
| EP | 1 744 083 A2 | 1/2007 |
| EP | 1 762 417 A1 | 3/2007 |
| EP | 1 785 305 A2 | 5/2007 |
| FR | 2 722 738 A1 | 1/1996 |
| FR | 2 796 437 A1 | 1/2001 |
| FR | 2 892 471 A1 | 4/2007 |
| WO | 00/03163 A1 | 1/2000 |
| WO | 02/086343 A1 | 10/2002 |
| WO | 03/066367 A1 | 8/2003 |
| WO | 2004/111441 A1 | 12/2004 |
| WO | 2006/053624 A1 | 5/2005 |
| WO | 2006/020476 A2 | 2/2006 |

* cited by examiner

METHOD FOR CARRYING OUT A LOAD SHIFT IN VEHICLES WITH ELECTRIC DRIVE

This application is a National Stage completion of PCT/EP2008/060443 filed Aug. 8, 2008, which claims priority from German patent application serial no. 10 2007 038 775.1 filed Aug. 16, 2007.

FIELD OF THE INVENTION

The present invention relates to a method for carrying out a shift under load in electric vehicles having a change-under-load transmission or in hybrid vehicles having a hybrid transmission during purely electric driving operation.

BACKGROUND OF THE INVENTION

From the prior art hybrid vehicles comprising a hybrid drive are known. Besides the internal combustion engine they comprise at least one electric motor or electric machine. In serial hybrid vehicles a generator supplies electrical energy to the electric motor that drives the wheels. In addition parallel hybrid vehicles are known, in which the torques of the internal combustion engine and of at least one electric machine that can be connected to the internal combustion engine are added. In this case the electric machines can be connected to the belt drive or to the crankshaft of the internal combustion engine. The torques produced by the internal combustion engine and/or the at least one electric machine are transmitted to the driven axle by a downstream transmission.

For example, known from DE 102006019679 A1 is a drivetrain with an electrically controllable hybrid drive and an electro-hydraulic control system, a number of electric power units and a number of torque transmission mechanisms. In this case the torque transmission mechanisms can be selectively engaged by the electro-hydraulic control system to produce four forward gears, a neutral condition, an electric operating mode with low and high rotation speeds, an electrically adjustable operating mode with low and high rotation speeds, and an uphill operating mode.

From DE 102005057607 B3 a hybrid drive for vehicles is known, which comprises at least a main motor, in particular an internal combustion engine, a generator, an electric motor and a planetary transmission comprising a sun gear, an ring gear, a planetary gear carrier and planetary gearwheels, which has at least one drive output shaft. In this case it is provided that for a first driving range of the vehicle, in order to add the torques, the driveshafts of the main motor and of the electric motor are coupled to the sun gear of the planetary transmission, and for a further driving range one of the two motors can be coupled by frictional means to the ring gear of the planetary transmission for the mechanical addition of the rotation speeds in accordance with the superimposition principle.

In a shift under load carried out according to the prior art the speed adaptation of the motor required for synchronization to the new gear takes place with the help of the shift elements involved and by action upon the motor torque.

For example, in a traction upshift the transmission capacity of the shift element to be engaged is first increased in order to take up the load and at the same time the transmission capacity of the shift element to be disengaged is reduced, and when the load has been taken up by the shift element being engaged, the speed of the motor is adapted with the help of the shift elements and by action upon the engine torque. In a purely electric load shift the speed of the electric machine is adapted; furthermore, the action upon the torque is carried out at the electric machine. Then, the shift element being disengaged is disengaged completely and the shift element being engaged is engaged completely.

According to the prior art, during such load shifts the electric machine remains torque-controlled during the shift, with specification of a nominal drive torque, and the action upon the torque is performed by the shift sequence control means.

SUMMARY OF THE INVENTION

The purpose of the present invention is to indicate a method for carrying out a shift under load in electric vehicles having a change-under-load transmission or in hybrid vehicles having a hybrid transmission during purely electric operation, such that by implementing the method shifting times are made shorter and shifting comfort is increased.

According to these it is proposed to carry out the adaptation of the speed of the electric machine required for synchronization to the new gear in a speed regulation mode, such that the electric machine is adjusted under speed regulation to the target speed or connection speed (synchronous speed) of the new gear, so that the shift element to be engaged is synchronized.

According to the invention, the speed variation is so designed that the speed of the electric machine approaches the target speed with a low gradient. In an advantageous manner, the torques of the shift elements that act upon the electric machine serve as pilot control means for the speed regulation of the electric machine.

During the speed regulation phase the torques at the shift elements determine the drive output torque since the shift elements are operating in slipping mode and are governed by the nominal driving torque.

When the speed of the electric machine reaches the target or synchronous speed of the gear being engaged, the electric machine is changed back again to the torque-controlled mode and the shift element being engaged is engaged completely. On completion of the load shift the electric machine is coupled to the transmission output by the new transmission gear.

Thanks to the concept according to the invention shifting times are made shortened since the speed of an electric machine can be regulated precisely and dynamically. Furthermore, the smooth approach of the electric machine's speed to the target or synchronous speed of the new gear ensures particularly great shifting comfort since the change of the dynamic torque of the internal combustion engine and the electric machine caused by the mass moment of inertia of the motors at the time when the shift element being engaged 'catches', is only small.

A further advantage of the method according to the invention is that the sequence of the load shift is simpler to implement and adjust compared with a shift under load with action upon the torque as in the prior art.

BRIEF DESCRIPTION OF THE DRAWINGS

Below, an example of the invention is explained in more detail with reference to the attached figures, which show.

DETAILED DESCRIPTION OF THE PREFERRED EMBODIMENTS

Figure 1:
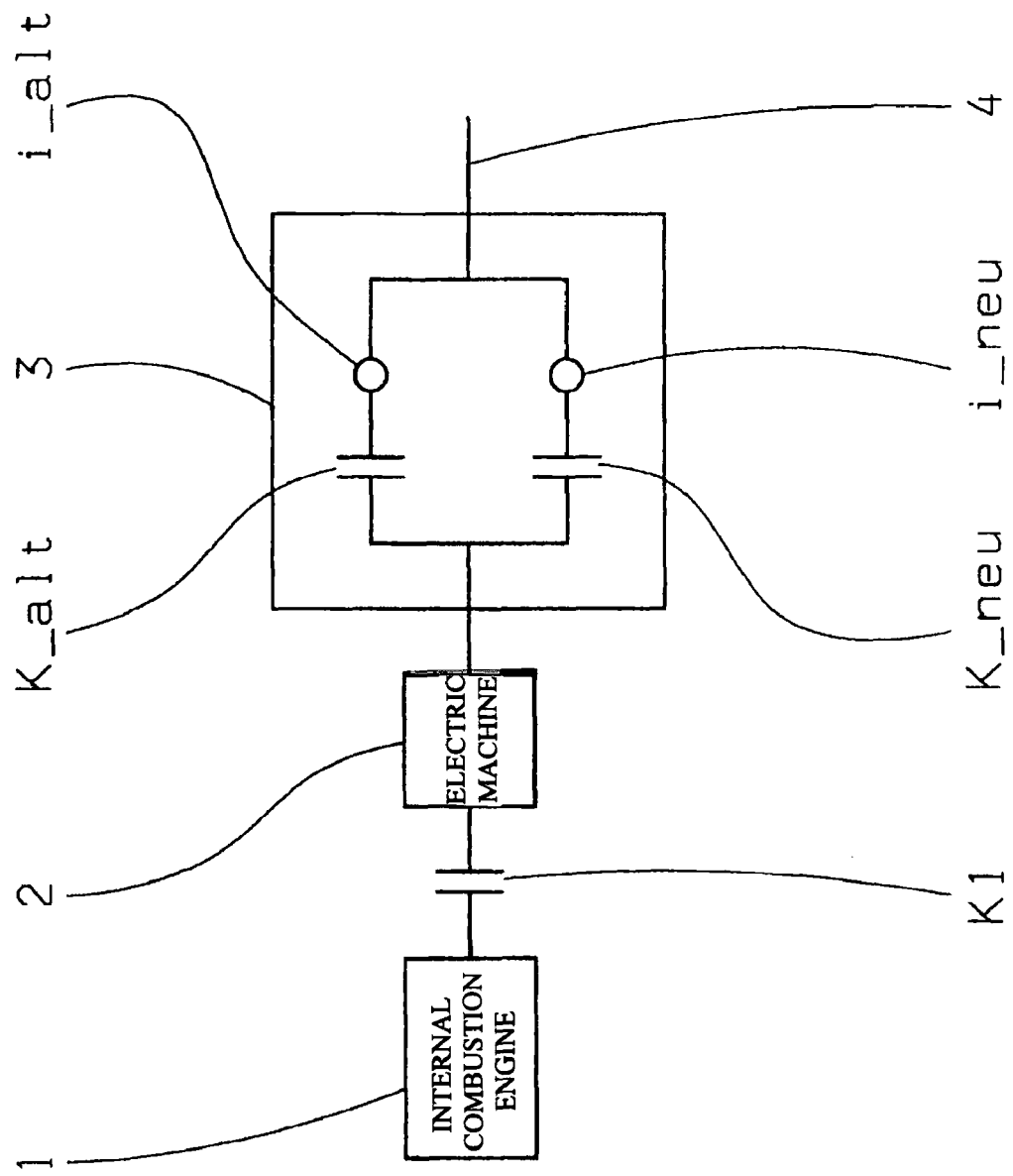
FIG. 1: Example of a schematic and simplified representation of the drivetrain of a parallel hybrid vehicle.

Referring to FIG. 1, the drivetrain of a parallel hybrid vehicle comprises an internal combustion engine 1 and at least one electric machine 2 connected in that order one after the other, so that by disengaging a clutch K1 the internal combustion engine 1 can be decoupled from the electric machine 2 and thus from the drivetrain as a whole. In FIG. 1 the drive output of the change-under-load transmission is indexed 4.

After the electric machine 2 in the force flow direction a change-under-load transmission 3 is arranged and which, in the simplified example representation shown for the purpose of illustrating the method according to the invention, comprises a clutch K_neu to be engaged for the new gear being engaged and a clutch K_alt to be disengaged for the old gear, each clutch or each gear being associated with a transmission ratio step with transmission ratios i_neu and i_alt respectively. In FIG. 1 the drive output of the change-under-load transmission is indexed 4.

At the beginning of the method according to the invention the internal combustion engine 1 is either switched off, or idling with the clutch K1 disengaged. Since the load shift according to the invention is carried out with the clutch K1 disengaged, the method can also be used to good advantage in purely electric vehicles having a change-under-load transmission. Below, the method according to the invention will be described with reference to a traction upshift from i_alt to i_neu.

According to the invention, the transmission capacity of the clutch K_neu to be engaged in order to take up the load is first increased and at the same time the transmission capacity of the clutch K_alt to be disengaged is reduced. Once the load has been taken up by the clutch K_neu the electric machine 2 is changed from the torque-controlled mode to a speed regulation mode and in this speed regulation mode the speed of the electric machine 2 is adapted in such manner that under speed regulation the electric machine 2 is adjusted to the target speed or synchronous speed of the new gear; at the same time the shift element K_alt being disengaged is disengaged completely.

Figure 2:
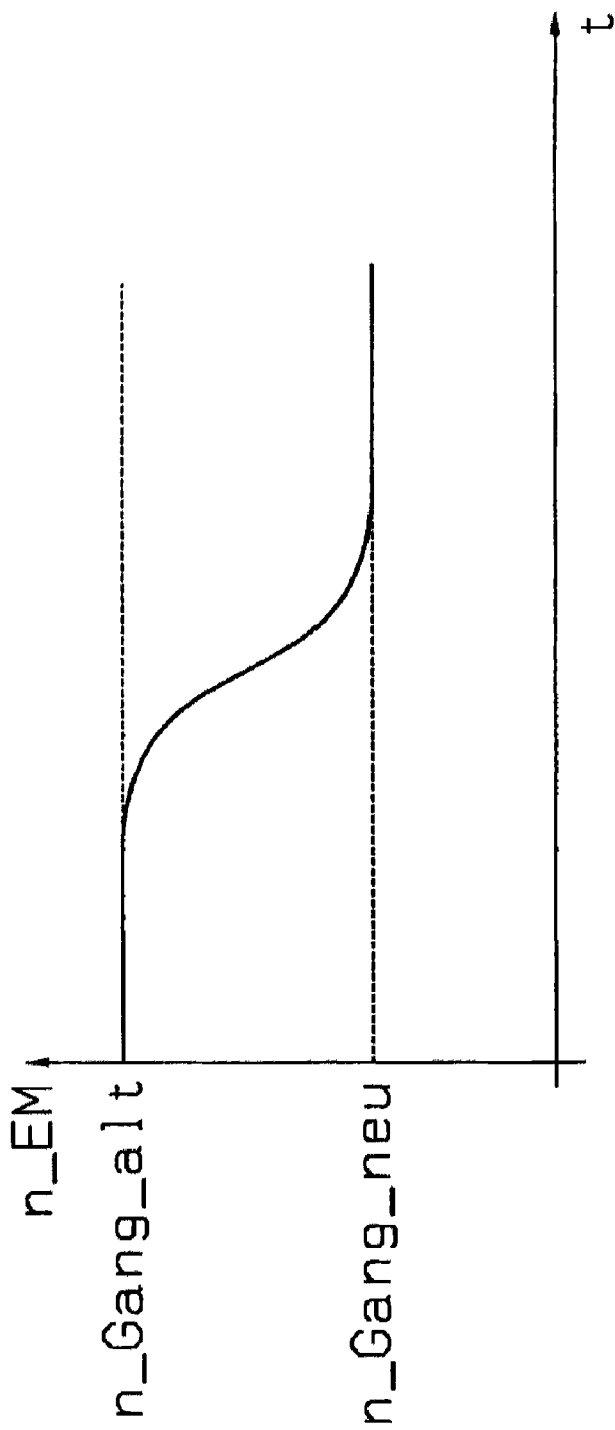
FIG. 2: Diagram illustrating the variation of the speed of the electric motor during a traction upshift according to the invention

Advantageously, during the speed adaptation of the electric machine 2 its speed variation is designed such that the speed approaches the target or connection speed of the new gear with a low gradient, with the torques of the clutches K_alt, K_neu which act upon the electric machine 2, serving as pilot control means for the speed regulation. An example variation of the nominal speed of the electric machine 2 n_EM as a function of time is the object of FIG. 2. In the figure n_Gang_alt denotes the speed of the electric machine 2 when the old gear is engaged (i.e. with the clutch K_alt engaged) and n_Gang_neu is the synchronous speed of the new gear during the load shift to be carried out.

When the speed then reaches the synchronous speed n_Gang_neu the electric machine 2 is returned to the torque-controlled mode and the clutch K_neu is engaged completely, so that the electric machine 2 is coupled to the drive output of the transmission by the new transmission gear.

For a traction downshift, the transmission capacity of the clutch K_alt to be disengaged is first reduced, and as soon as slip is detected at K_alt the electric machine 2 is changed from the torque-controlled to the speed regulation mode. Then the speed of the electric machine 2 is increased up to a speed higher than the synchronous speed at the clutch K_neu to be engaged, since a positive speed difference must be present at K_neu for that clutch to be able to transmit a traction torque.

In the next step, the transmission capacity of the clutch K_neu to be engaged is increased and that of the clutch K_alt being disengaged is reduced further, so that a continuous load transfer to K_neu is achieved. Once the clutch K_neu being engaged has taken up the load, the clutch K_alt being disengaged is engaged completely and the speed of the electric machine 2 is adjusted in the speed regulation mode to the synchronous speed at the clutch K_neu being engaged. When the synchronous speed has been reached, the electric machine is returned to the torque-controlled mode and the clutch K_neu being engaged is engaged completely.

For the case of a thrust downshift, to take up the load the transmission capacity of the clutch K_neu to be engaged is first increased and at the same time the transmission capacity of the clutch K_alt to be disengaged is reduced. When K_neu has taken up the load, the electric machine 2 is changed from the torque-controlled to the speed regulation mode and the clutch K_alt being disengaged is disengaged completely. Then, under speed regulation the electric machine is adjusted to the synchronous speed, preferably in such manner that its speed approaches the target speed with a low gradient. When the synchronous speed has been reached, the electric machine is returned to the torque-controlled mode and the clutch K_neu being engaged is engaged completely.

In the principle of their sequences a thrust upshift and a traction downshift are similar, the difference being that the signs of the torques are different and the speed variation moves in the other direction. Accordingly, in a thrust upshift the transmission capacity of the clutch to be disengaged is first reduced continuously and as soon as slip is detected at K_alt the electric machine is changed from the torque-controlled to a speed regulation mode in which its speed is reduced to a value lower than the synchronous speed at the shift element K_neu to be engaged, since a negative speed difference is required for the shift element being engaged to be able to transmit torque. The transmission capacity of the shift element K_neu being engaged is then increased and that of the shift element being disengaged is reduced still further, so that a continuous load transfer to K_neu takes place.

Once the load has been taken up by the clutch K_neu being engaged, the clutch K_alt being disengaged is disengaged completely and the speed of the electric machine is adjusted in the speed regulation mode to the synchronous speed at the clutch K_neu being engaged. When the synchronous speed has been reached, the electric machine is returned to the torque-controlled mode and the clutch K_neu is engaged completely.

INDEXES

1 Internal combustion engine
2 Electric machine
3 Change-under-load transmission
4 Drive output of the transmission
K1 Clutch
K_neu Clutch
K_alt Clutch
n_EM Speed of the electric machine
n_Gang_alt Speed of the electric machine when the old gear is engaged
n_Gang_neu Synchronous speed of the new gear
i_alt Transmission ratio
i_neu Transmission ratio

The invention claimed is:

1. A method of carrying out a shift under load in either an electric vehicle having a change-under-load transmission or a hybrid vehicle having a hybrid transmission during purely electric driving operation, the method comprising the steps of:
   employing an electric machine being operatable in both a speed control mode and a torque regulation mode;
   carrying out a shift under load in the transmission during a purely electric driving operation by operating the electric machine in the torque-controlled mode; and
   adapting a speed of the electric machine (2), required for synchronization to a new gear, with the electric machine operating in the speed regulation mode.

2. The method of carrying out a load shift according to claim 1, the method further comprising the step of adapting the speed of the electric machine (2) such that a slope of the speed of the electric machine (2) (n_EM), with respect to time, comprising the time the electric machine (2) changes from a speed associated with an old gear (n_Gang_alt) to a target speed associated with a new gear (n_Gang_neu), forms a sigmoidal curve.

3. The method of carrying out a load shift according to claim 2, the method further comprising the step of forming the sigmoidal curve to be substantially shaped as an ogee curve.

4. The method of carrying out a load shift according to claim 1, the method further comprising the step of utilizing torque (K_alt, K_neu) of shift elements, acting on the electric machine (2), as pilot control means for the speed adaptation of the electric machine (2).

5. The method of carrying out a load shift according to claim 1, the method further comprising the step of, when the speed (n_EM) of the electric machine (2) reaches either a target speed or a synchronous speed (n_Gang_neu) of a gear to be engaged, returning the electric machine (2) to the torque-controlled mode and completely engaging a shift element (K_neu) being engaged.

6. The method of carrying out a load shift according to claim 1, the method further comprising the step of increasing, in a traction upshift, a transmission capacity of a new clutch (K_neu) to be engaged to assume the load;
   simultaneously reducing a transmission capacity of an engaged clutch (K_alt) to be disengaged,
   changing the electric machine (2) to the speed regulation mode, when the load has been assumed by the new clutch (K_neu) being engaged; and
   adapting the speed of the electric machine (2) to a synchronous speed of a gear to be engaged such that, in the speed regulation mode, the electric machine (2) is adjusted to either a target speed or a synchronous speed of the gear to be engaged and simultaneously completely disengaging the engaged clutch (K_alt) being disengaged.

7. The method of carrying out a load shift according to claim 1, the method further comprising the step of:
   reducing, in a traction downshift, a transmission capacity of a shift element (K_alt) to be disengaged;
   changing the electric machine (2) from the torque-controlled mode to the speed regulation mode as soon as slip is detected in the shift element (K_alt) being disengaged;
   increasing the speed of the electric machine (2), in the speed regulation mode, to a speed higher than a synchronous speed of a shift element (K_neu) to be engaged;
   increasing a transmission capacity of the shift element (K_neu) to be engaged and further reducing the transmission capacity of the shift element (K_alt) being disengaged, such that uptake of the load by the shift element (K_neu) being engaged is continuous; and
   completely disengaging the shift element (K_alt) being disengaged on completion of the load uptake by the shift element (K_neu) being engaged and adjusting the speed of the electric machine (2) to the synchronous speed of the shift element (K_neu) being engaged.

8. The method of carrying out a load shift according to claim 1, the method further comprising the step of:
   essentially simultaneously increasing, in a thrust downshift, a transmission capacity of a shift element (K_neu) to be engaged and reducing a transmission capacity of a shift element (K_alt) to be disengaged;
   changing the electric machine (2) from the torque-controlled mode to the speed regulation mode, after a load is assumed by the shift element (K_neu) being engaged;
   substantially disengaging the shift element (K_alt) being disengaged; and
   adjusting a speed of the electric machine (2), in the speed regulation mode, to a synchronous speed and essentially simultaneously completely disengaging the shift element (K_alt) being disengaged.

9. The method of carrying out a load shift according to claim 1, the method further comprising the step of:
   continuously reducing, in a thrust upshift, a transmission capacity of a shift element (K_alt) to be disengaged;
   changing the electric machine (2) from the torque-controlled mode to the speed regulation mode, when slip is detected at the shift element (K_alt) being disengaged, and reducing the speed of the electric machine (2) to a value lower than a synchronous speed of the shift element (K_neu) to be engaged;
   increasing a transmission capacity of the shift element (K_neu) to be engaged and reducing the transmission capacity of the shift element (K_alt) being disengaged such that uptake of the load by the shift element (K_neu) being engaged is continuous; and
   completely disengaging the shift element (K_alt) being disengaged on completion of the load uptake by the shift element (K_neu) being engaged and adjusting the speed of the electric machine (2), in the speed regulation mode, to the synchronous speed of the shift element (K_neu) being engaged.

10. A method of carrying out a shift under load in either an electric vehicle having a change-under-load transmission or a hybrid vehicle having a hybrid transmission during purely an electric driving operation in which the vehicle comprises an electric machine and an internal combustion engine with a drive train clutch located between the electric machine and the internal combustion engine, the method comprising the steps of:
   employing an electric machine being operatable in both a speed control mode and a torque regulation mode;
   disengaging the drive train clutch located between the electric machine and the internal combustion engine, during a shift, so as to provide purely an electric driving operation and operating the electric machine in the torque-controlled mode;
   carrying out a shift under load in the transmission during the purely electric driving operation;
   changing the electric machine from the torque-controlled mode to a speed regulation mode once the transmission load of the vehicle is taken up by a new clutch to be engaged; and
   adapting a speed of the electric machine, required for synchronization to a new gear, with the electric machine operating during the speed regulation mode.

11. The method of carrying out a load shift according to claim 10, the method further comprising the step of adapting the speed of the electric machine such that a slope of the speed of the electric machine, with respect to time, changes from a speed associated with an old gear (n_Gang_alt) to a target speed associated with a new gear (n_Gang_neu), forms a sigmoidal curve.

12. The method of carrying out a load shift according to claim 10, the method further comprising the step of utilizing torque (K_alt, K_neu) of shift elements, acting on the electric machine, as pilot control means for the speed adaptation of the electric machine.

13. The method of carrying out a load shift according to claim 10, the method further comprising the step of, when the speed of the electric machine reaches either a target speed or a synchronous speed (n_Gang_neu) of a gear to be engaged, returning the electric machine (2) to the torque-controlled mode and completely engaging a shift element (K_neu) to be engaged.

14. The method of carrying out a load shift according to claim 10, the method further comprising the step of increasing, in a traction upshift, a transmission capacity of the new clutch (K_neu) to be engaged to assume the load;
simultaneously reducing a transmission capacity of an engaged clutch (K_alt) to be disengaged,
changing the electric machine (2) to the speed regulation mode, when the load has been assumed by the new clutch (K_neu) to be engaged; and
adapting the speed of the electric machine (2) to a synchronous speed of a gear to be engaged such that, in the speed regulation mode, the electric machine (2) is adjusted to either a target speed or a synchronous speed of the gear to be engaged and simultaneously completely disengaging the engaged clutch (K_alt) to be disengaged.

15. The method of carrying out a load shift according to claim 10, the method further comprising the step of:
reducing, in a traction downshift, a transmission capacity of a shift element (K_alt) to be disengaged;
changing the electric machine from the torque-controlled mode to the speed regulation mode as soon as slip is detected in the shift element (K_alt) to be disengaged;
increasing the speed of the electric machine, in the speed regulation mode, to a speed higher than a synchronous speed of a shift element (K_neu) to be engaged;
increasing a transmission capacity of the shift element (K_neu) to be engaged and further reducing the transmission capacity of the shift element (K_alt) to be disengaged, such that uptake of the load by the shift element (K_neu) to be engaged is continuous; and
completely disengaging the shift element (K_alt) to be disengaged on completion of the load uptake by the shift element (K_neu) to be engaged and adjusting the speed of the electric machine (2) to the synchronous speed of the shift element (K_neu) to be engaged.

16. The method of carrying out a load shift according to claim 10, the method further comprising the step of:
simultaneously increasing, in a thrust downshift, a transmission capacity of a shift element (K_neu) to be engaged and reducing a transmission capacity of a shift element (K_alt) to be disengaged;
changing the electric machine (2) from the torque-controlled mode to the speed regulation mode, after a load is assumed by the shift element (K_neu) to be engaged;
substantially disengaging the shift element (K_alt) to be disengaged; and
adjusting a speed of the electric machine (2), in the speed regulation mode, to a synchronous speed and essentially simultaneously completely disengaging the shift element (K_alt) to be disengaged.

17. The method of carrying out a load shift according to claim 10, the method further comprising the step of:
continuously reducing, in a thrust upshift, a transmission capacity of a shift element (K_alt) to be disengaged;
changing the electric machine (2) from the torque-controlled mode to the speed regulation mode, when slip is detected at the shift element (K_alt) to be disengaged, and reducing the speed of the electric machine (2) to a value lower than a synchronous speed of the shift element (K_neu) to be engaged;
increasing a transmission capacity of the shift element (K_neu) to be engaged and reducing the transmission capacity of the shift element (K_alt) being disengaged such that uptake of the load by the shift element (K_neu) to be engaged is continuous; and
completely disengaging the shift element (K_alt) to be disengaged on completion of the load uptake by the shift element (K_neu) to be engaged and adjusting the speed of the electric machine (2), in the speed regulation mode, to the synchronous speed of the shift element (K_neu) to be engaged.

18. A method of carrying out a shift under load in either an electric vehicle having a change-under-load transmission or a hybrid vehicle having a hybrid transmission during purely an electric driving operation in which the vehicle comprises an electric machine and an internal combustion engine with a drive train clutch located between the electric machine and the internal combustion engine, the method comprising the steps of:
employing an electric machine which is operatable in both a speed control mode and a torque regulation mode;
disengaging the drive train clutch located between the electric machine and the internal combustion engine, during a shift, so as to provide purely an electric driving operation and operating the electric machine in the torque-controlled mode;
carrying out a shift under load in the transmission during the purely electric driving operation by increasing a transmission capacity of a new clutch to be engaged, in order to take up a transmission load of the vehicle, and, at the same time, reducing a transmission capacity of an engaged clutch to be disengaged;
changing the electric machine from the torque-controlled mode to a speed regulation mode once the transmission load of the vehicle is taken up by the new clutch to be engaged; and
adapting a speed of the electric machine, required for synchronization to a new gear, with the electric machine operating during the speed regulation mode and simultaneously completely disengaging the engaged clutch (K_alt) to be disengaged.

* * * * *